United States Patent
Hong et al.

(10) Patent No.: US 9,350,200 B1
(45) Date of Patent: May 24, 2016

(54) AUXILIARY POWER UNIT FOR EMERGENCY LIGHT IN CASE OF FIRE OR POWER FAILURE

(71) Applicants: HYUNG JE ELECTRIC CO., LTD., Gyeonggi-do (KR); Jeong Gi Hong, Gyeonggi-do (KR); Min Ki Hong, Gyeonggi-do (KR)

(72) Inventors: Jeong Gi Hong, Gyeonggi-do (KR); Min Ki Hong, Gyeonggi-do (KR)

(73) Assignees: HYUNG JE ELECTRIC CO., LTD., Suwon-si, Gyeonggi-do (KR); Jeong Gi Hong, Suwon-si, Gyeonggi-do (KR); Min Ki Hong, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/971,041

(22) Filed: Dec. 16, 2015

(30) Foreign Application Priority Data

Nov. 3, 2015 (KR) .......................... 10-2015-0153956

(51) Int. Cl.
*H05B 37/02* (2006.01)
*H02J 9/06* (2006.01)

(52) U.S. Cl.
CPC ..................................... *H02J 9/061* (2013.01)

(58) Field of Classification Search
USPC ....................................................... 315/86–93
See application file for complete search history.

(56) References Cited

U.S. PATENT DOCUMENTS

2008/0191628 A1* 8/2008 Marques ................ H05B 37/04
315/86

FOREIGN PATENT DOCUMENTS

KR  10-2015-0021637 A  3/2015

* cited by examiner

*Primary Examiner* — Thuy Vinh Tran
*Assistant Examiner* — Jonathan Cooper
(74) *Attorney, Agent, or Firm* — Rabin & Berdo, P.C.

(57) ABSTRACT

An APU for an emergency light in case of a fire or power failure includes: a regular power input unit; an emergency power input unit; a changeover switch configured to switch the power input such that the emergency light is automatically turned on by the emergency power in case of a power failure of the regular power; a firefighting power monitoring relay operated by firefighting power when a fire occurs; a firefighting-power-monitoring-relay contact switch configured to connect power from an ATS to the emergency power input unit in connection with the firefighting power monitoring relay; a fire driving unit operated by the power inputted to the emergency power input unit; and an emergency light auto lighting switch configured to connect the emergency light to the regular power input unit, such that the emergency light is automatically turned on.

4 Claims, 7 Drawing Sheets

AUXILIARY POWER UNIT FOR EMERGENCY LIGHT IN CASE OF FIRE OR POWER FAILURE

BACKGROUND

1. Technical Field

The present disclosure relates to a unit for supplying power to an emergency light in case of a fire or power failure, and more particularly, to an auxiliary power unit (APU) for an emergency light in case of a fire or power failure, which automatically turns on emergency lights installed at emergency paths and emergency exits when a fire occurs in a live wire state of regular power, such that people in danger can safely escape from the building.

2. Related Art

In general, emergency lights are installed at an emergency path and emergency exit in a building such as an apartment house. Typically, the emergency light is turned on in case of power failure, and induces people in danger to move to a safe path.

Figure 1:
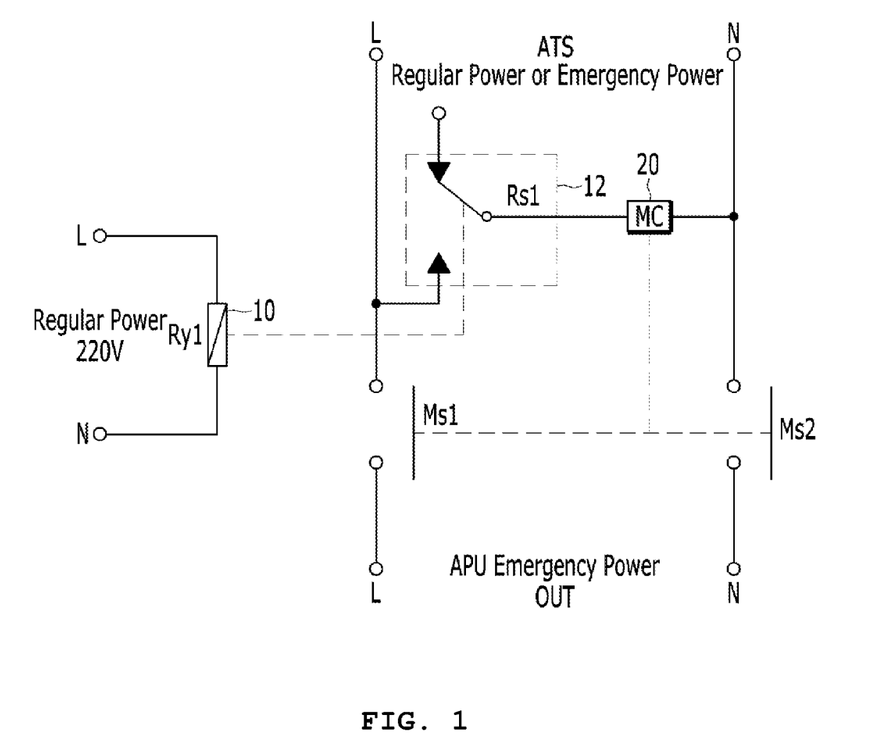
FIG. 1 illustrates a system which receives emergency power from a conventional ATS (Auto Changeover switch).
Figure 2:
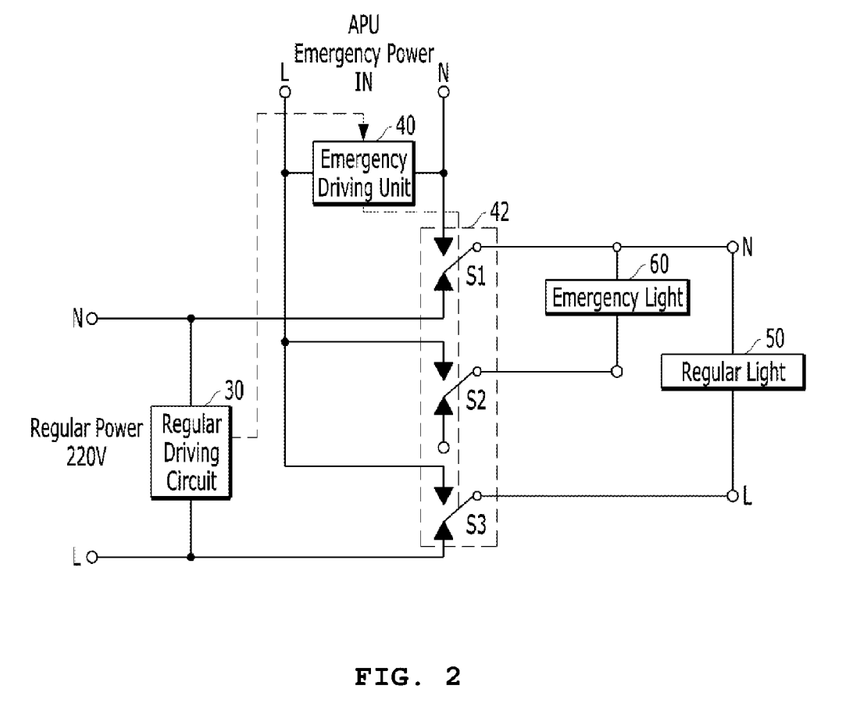
FIG. 2 illustrates a system which supplies power to an emergency light and a regular light through a conventional APU (Auxiliary Power Unit).

FIG. 1 illustrates a system which receives emergency power from a conventional ATS (Auto Changeover switch), and FIG. 2 illustrates a system which supplies power to an emergency light and a regular light through a conventional APU (Auxiliary Power Unit).

The ATS automatically switches over between regular power received from a power supply company (for example, Korean Electric Power Corporation (KEPCO)) and emergency power such as generator power, and receives the regular power or emergency power through an input terminal. While the regular power is applied, a relay (Ry1) 10 is energized, and a contact switch (Rs1) 12 of the relay is opened as illustrated in FIG. 1, such that no power is supplied to a magnetic switch (MC) 20. That is, contact switches Ms1 and Ms2 of the magnetic switch 20 are opened to block the supply of emergency power to the APU.

Referring to FIG. 2, a regular driving circuit 30 is installed at a supply terminal of the regular power, and an emergency driving unit 40 is installed at an input terminal of the emergency power. When the regular power is supplied, the emergency driving unit 40 is not operated by the regular driving circuit 30. The changeover switch (S1 to S3) 42 connected to the emergency driving unit 40 connect the circuit to supply the regular power toward a load. As illustrated in the circuit diagram of FIG. 2, the regular power is supplied to the regular light 50, and no power is supplied to the emergency light 60.

When a power failure occurs, the power supply to the relay 10 illustrated in FIG. 1 is blocked, and the contact switch 12 of the relay is closed to supply emergency power to the magnetic switch 20. Then, the contact switches Ms1 and Ms2 of the magnetic switch 20 are closed to apply the emergency power to an APU emergency power input terminal of FIG. 2. Since the regular power is blocked, the regular driving circuit 30 is not operated, but the emergency driving unit 40 is operated by the emergency power. The emergency driving unit 40 switches the changeover switch 42 to supply the emergency power to the emergency light 60. Then, the emergency light 60 is automatically turned on.

In most cases, since a power failure is accompanied when a fire occurs, emergency power is supplied. However, regular power may be still alive in many cases. When a fire occurs in the live wire state of the regular power, the emergency light 60 is not automatically turned on, because the supply of emergency power to the emergency light 60 is blocked. In this case, a lighting switch installed in the emergency light 60 must be manually operated to supply the regular power to the emergency light 60, such that the emergency light 60 can be turned on.

However, since the visual fields of people are hidden by smoke when a fire occurs, the people may not find the lighting switch of the emergency light 60. Furthermore, it is very difficult for the people in the emergency situation to calmly operate the lighting switch of the emergency light 60.

Korean Patent Publication No. 10-2015-0021637 discloses an auxiliary power unit for emergency lighting. The patent document discloses a technology which guides the position of an emergency exit through emergency lighting in order to minimize losses of life when a power failure occurs in a building.

However, the patent document only discloses the technology which automatically turns on the emergency light in case of a power failure. When a fire occurs in the live wire state of regular power, an emergency light is not automatically turned on, but must be manually turned on.

PRIOR ART DOCUMENT

Patent Document (Patent Document 1) Korean Patent Publication 10-2015-0021637

SUMMARY

Various embodiments are directed to an auxiliary power unit (APU) for an emergency light in case of a fire or power failure, which is capable of not only turning on an emergency light in case of a power failure of regular power, but also automatically turning on an emergency light even when a fire occurs in a live wire state of the regular power, such that people in danger can safely escape from a building through an emergency path and exist without a separate switch operation.

In an embodiment, an APU for an emergency light in case of a fire or power failure may include: a regular power input unit installed at the rear of a switching unit for switching over between regular power and emergency power, and configured to receive the regular power and supply the received regular power to a regular light; an emergency power input unit configured to receive the emergency power and supply the received emergency power to an emergency light; a changeover switch configured to switch the power input such that the emergency light is automatically turned on by the emergency power in case of a power failure of the regular power; a firefighting power monitoring relay operated by firefighting power when a fire occurs; a firefighting-power-monitoring-relay contact switch configured to connect power from an ATS (Auto Changeover switch) to the emergency power input unit in connection with the firefighting power monitoring relay; a fire driving unit installed in the emergency power input unit and operated by the power inputted to the emergency power input unit; and an emergency light auto lighting switch configured to connect the emergency light to the regular power input unit in connection with the fire driving unit, such that the emergency light is automatically turned on.

The regular power input unit may have a regular driving circuit installed therein, the emergency power input unit may have an emergency driving unit installed therein, and the regular driving circuit may block the operation of the emergency driving unit when the regular power is supplied.

The regular driving circuit may include a microcomputer which detects the regular power supplied to the regular power input unit and outputs a switching signal for switching the connection between the emergency power input unit and the emergency driving unit.

The regular driving circuit may further include a regular power display LED and a photo coupler which are connected in series between a phase wire and a neutral wire of the regular power input unit, and an emergency power display LED connected between a clock output terminal of the microcomputer and the ground, the photo coupler may have an emitter terminal connected to a DC constant voltage terminal through a resistor and a collector terminal connected to the ground, and the microcomputer may have an input terminal connected to a connection point between the emitter terminal and the resistor, and receive an input signal to flicker the emergency power display LED in a state where the photo coupler is turned off.

DETAILED DESCRIPTION

Exemplary embodiments will be described below in more detail with reference to the accompanying drawings. The disclosure may, however, be embodied in different forms and should not be constructed as limited to the embodiments set forth herein. Rather, these embodiments are provided so that this disclosure will be thorough and complete, and will fully convey the scope of the disclosure to those skilled in the art. Throughout the disclosure, like reference numerals refer to like parts throughout the various figures and embodiments of the disclosure.

Figure 3:
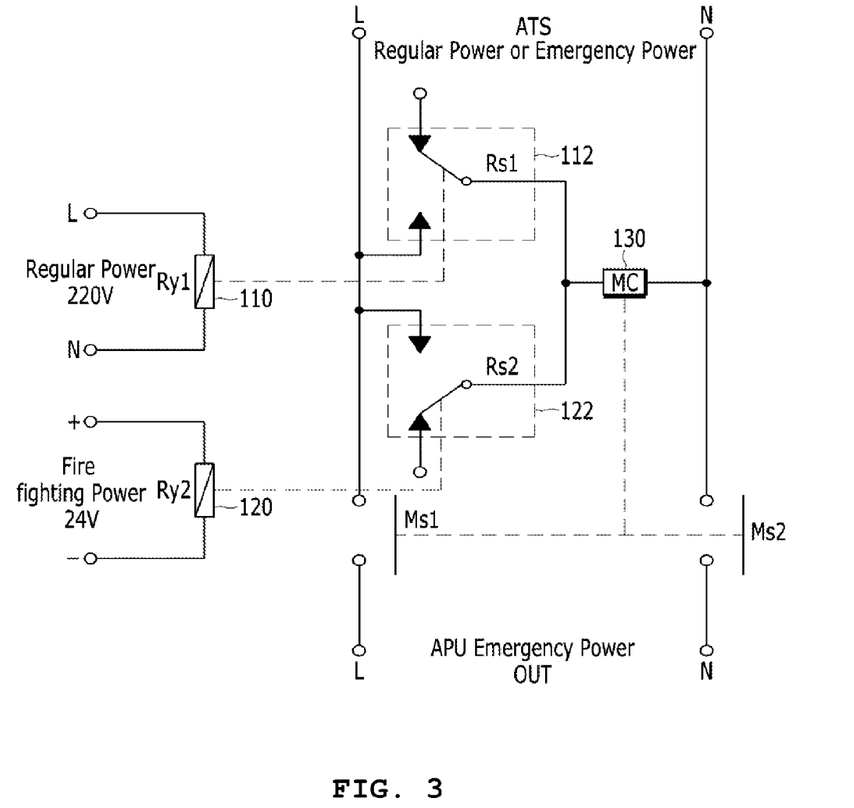
FIG. 3 illustrates a system which receives emergency power from an ATS according to an embodiment of the present invention.
Figure 4:
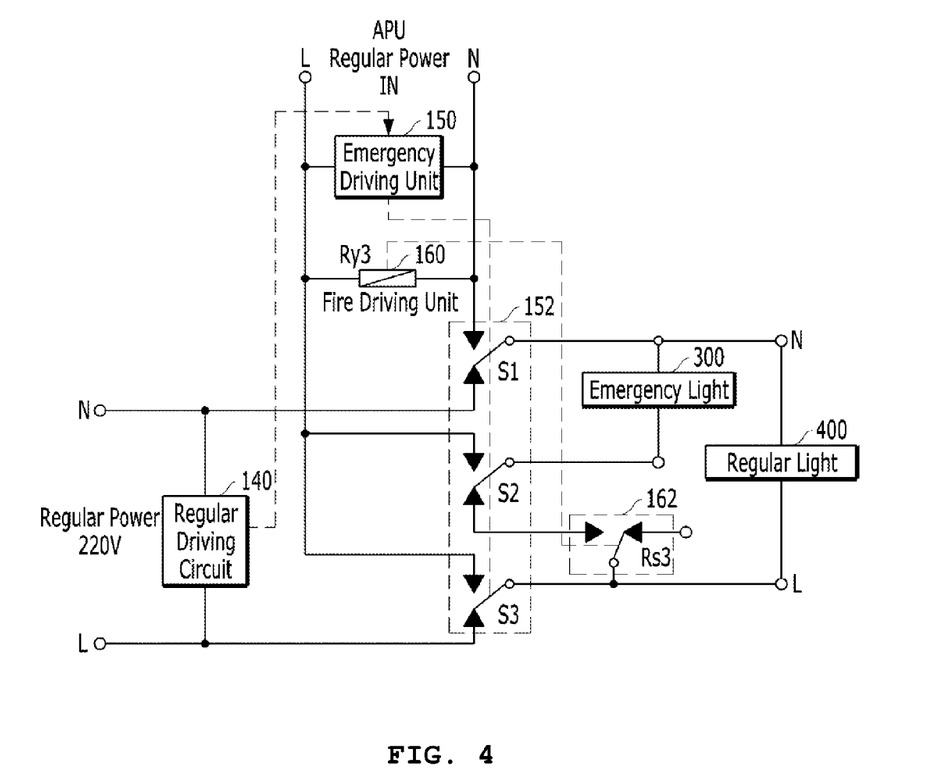
FIG. 4 is a system diagram illustrating an APU according to an embodiment of the present invention.

FIG. 3 illustrates a system which receives emergency power from an ATS (Auto Changeover switch) according to an embodiment of the present invention. FIG. 4 is a system diagram illustrating an APU (Auxiliary Power Unit) according to an embodiment of the present invention.

The ATS serves to automatically switch over from regular power received from a power supply company to emergency power such as generator power or battery power. Referring to FIG. 3, the regular power or emergency power is inputted from the ATS.

While the regular power is applied, a regular power monitoring relay (Ry1) 110 is energized as illustrated in the left side of FIG. 3, and a contact switch (Rs1) 112 of the regular power monitoring relay is opened to block power to a magnetic switch (MC) 130. Thus, contact switches Ms1 and Ms2 of the magnetic switch 130 are opened to block power output to an APU emergency power output terminal. That is, the regular power or emergency power is not applied to an APU emergency power input terminal in FIG. 4.

The APU indicates a power supply unit which supplies regular power or emergency power to a load while preferentially supplying the regular power.

When a power failure occurs, the power supply to the regular power monitoring relay 110 is blocked, and the contact switch 112 of the regular power monitoring relay is closed to supply the power from the ATS to the magnetic switch 130. Then, the contact switches Ms1 and Ms2 of the magnetic switch 130 are closed to apply the power from the ATS to the APU emergency power input terminal. At this time, the power is the emergency power because the regular power is blocked.

The system which supplies power from the ATS to the emergency power input terminal of the APU using the regular power monitoring relay 110 may be configured in the same manner as the conventional system.

The APU according to the embodiment of the present invention further includes a firefighting power monitoring relay (Ry2) 120 which is operated by firefighting power of DC 24V in case of fire. Typically, when a fire occurs, firefighting power is supplied to fire extinguishing facilities such as a fire alarm. In the present embodiment, the firefighting power monitoring relay 120 is energized by the firefighting power.

Referring to FIG. 3, a contact switch (Rs2) 122 of the firefighting power monitoring relay is opened at normal times to block the power supply to the magnetic switch 130. When the firefighting power monitoring relay 120 is energized, the contact switch 122 is closed to supply power to the magnetic switch 130. Then, the contact switches Ms1 and Ms2 of the magnetic switch 130 are closed to apply the power from the ATS to the APU emergency power input terminal. At this time, the power is the regular power if the regular power is alive.

Referring to FIG. 4, a regular driving circuit 140 is installed at a regular power input unit to which the regular power is inputted, and an emergency driving unit 150 is installed at the APU emergency power input terminal (hereafter, referred to as 'emergency power input unit'). As in a typical APU, the regular driving circuit 140 blocks the operation of the emergency driving unit 150 when the regular power is supplied. The emergency driving unit 150 is a relay which operates a changeover switch (S1 to S3) 152. When the regular power is supplied, the operation of the emergency driving unit 150 is stopped, and the changeover switch 152 connects the regular power to a load. When the regular power is blocked, the emergency driving unit 150 is driven by the emergency power, and switches the changeover switch 152. At this time, the emergency power is connected to the load.

The APU according to the embodiment of the present invention further includes a fire driving unit (Ry3) 160 installed in the emergency power input unit. For example, the fire driving unit 160 is a relay which operates an emergency light auto lighting switch (Rs3) 162 in the system diagram of FIG. 4.

Referring to FIG. 4, the changeover switch 152 includes three three-way switches. The first switch S1 has two selecting terminals and a fixed terminal. The selecting terminals are connected to the neutral wire of the emergency power input unit and the neutral wire of the regular power input unit, respectively, and the fixed terminal is connected to a common power input terminal N of the emergency light 300 and the regular light 400. The second switch S2 also has two selecting terminals and a fixed terminal. The selecting terminals are connected to the phase wire of the emergency power input unit and a selecting terminal of the emergency light auto lighting switch 162, respectively, and the fixed terminal is connected to another power input terminal L of the emergency light 300. The third switch S3 also has two selecting terminals and a fixed terminal. The selecting terminals are connected to the phase wire of the emergency power input unit and the phase wire of the regular power input unit, respectively, and the fixed terminal is connected to another power input terminal L of the regular light 400.

As illustrated in FIG. 4, one of the two selecting terminals of the emergency light auto lighting switch 162 is connected to one of the selecting terminals of the second switch S2, and the other selecting terminal is opened. The fixed terminal of the emergency light auto lighting switch 162 is connected to the fixed terminal of the third switch S3.

The operation of the APU according to the embodiment of the present invention will be described as follows.

First, the operations of the regular power in the live wire state and the power failure state in case of no fire are performed as follows.

In the live wire state of the regular power, the contact switch 112 of the regular power monitoring relay is opened as illustrated in the system diagram of FIG. 3. Furthermore, since no fire occurred, the contact switch 122 of the firefighting power monitoring relay is also opened. Thus, the contact switches Ms1 and Ms2 of the magnetic switch 130 are opened so as not to connect the power from the ATS to the emergency power input unit. The changeover switch 152 is switched over to the regular power input unit as illustrated in FIG. 4, and the regular power is supplied to the regular light 400. Although not illustrated, the emergency light 300 may be turned on by the regular power through a separate manual switch.

When the regular power is blocked, the ATS switches over to the emergency power. Then, while the power supply to the regular power monitoring relay 110 is blocked, the emergency power is supplied to the magnetic switch 130. The contact switches Ms1 and Ms2 of the magnetic switch 130 are closed to apply the emergency power from the ATS to the emergency power input terminal.

Since the regular power is blocked, the emergency driving unit 150 is operated by the emergency power. The emergency driving unit 150 switches the changeover switch 152 to connect the emergency power to the emergency light 300. Then, the emergency light 300 is automatically turned on by the emergency power.

Figure 5:
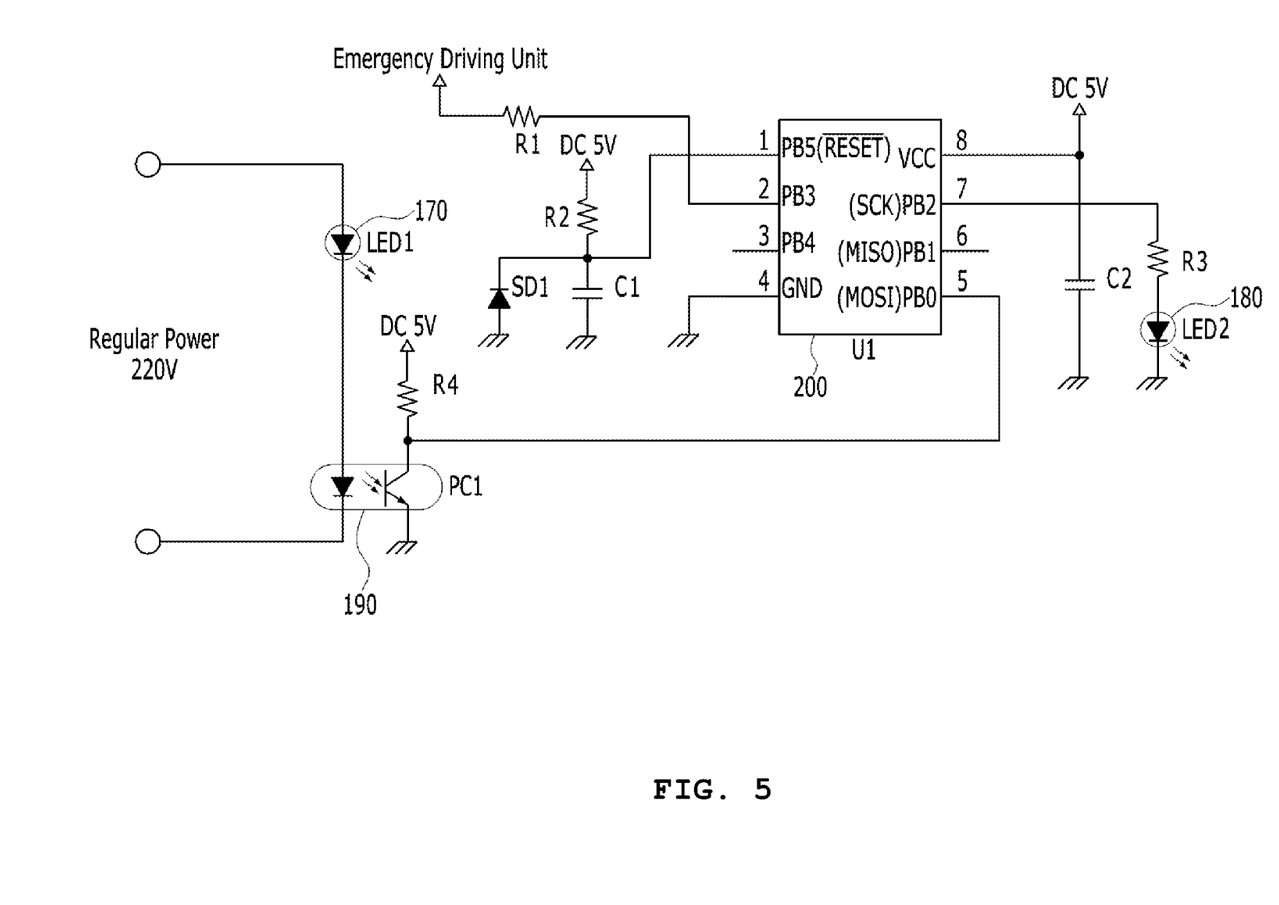
FIG. 5 is a circuit diagram illustrating a regular driving circuit according to the embodiment of the present invention.

Referring to FIG. 5, the regular driving circuit will be described as follows.

Referring to the circuit diagram of FIG. 5, a regular power display LED (LED1) 170 and an LED of a photo coupler (PC1) 190 are connected in series to both terminals of the regular power input unit. The regular power display LED 170 is a green LED which is turned on by the regular power and displays the live wire state of the regular power.

The photo coupler 190 has an emitter terminal connected to a DC constant voltage terminal through a resistor R4 and a collector terminal connected to the ground. The DC constant voltage terminal is connected to a constant voltage regulator (not illustrated) and outputs a voltage of DC 5V. The connection point between the emitter terminal and the resistor R4 is connected to an input terminal PB0 of a microcomputer 200. The photo coupler 190 bypasses the DC constant voltage terminal to the ground through a non-contact method in the live wire state of the regular power, and no input signal is transmitted to the microcomputer 200. At this time, the power supply to the emergency driving unit 150 connected to an output terminal PB3 of the microcomputer 200 is blocked.

When the photo coupler 190 is turned off, an H-level signal of the DC constant voltage terminal is applied to the input terminal PB0 of the microcomputer 200, and the microcomputer 200 transmits a switching signal to the output terminal PB3 in order to supply power to the emergency driving unit 150. Furthermore, the microcomputer 200 outputs a predetermined clock signal to a clock output terminal.

The clock output terminal of the microcomputer 200 is connected to the emergency power display LED (LED2) 180 through a resistor R3. The emergency power display LED 180 is a red LED which flickers according to the clock signal outputted from the microcomputer 200 in order to display the state in which the regular power is blocked.

Figure 6:
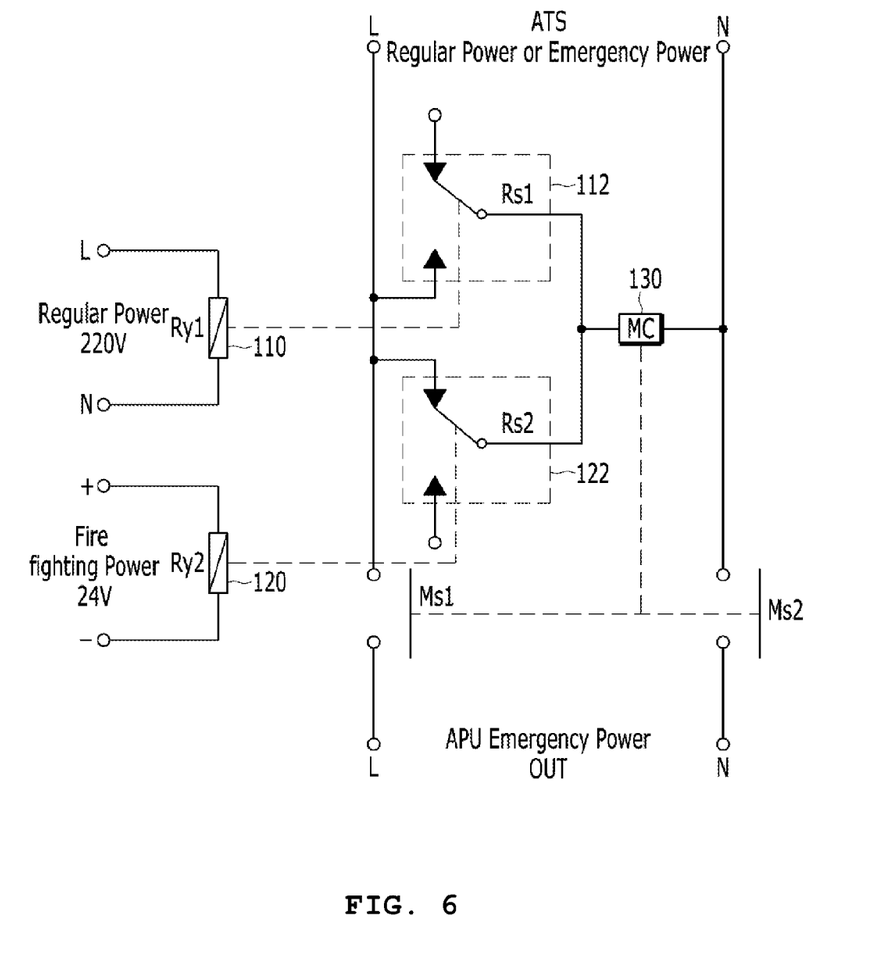
FIG. 6 is a system diagram illustrating a state in which emergency power is supplied when a fire occurs in a live wire state of regular power according to the embodiment of the present invention.
Figure 7:
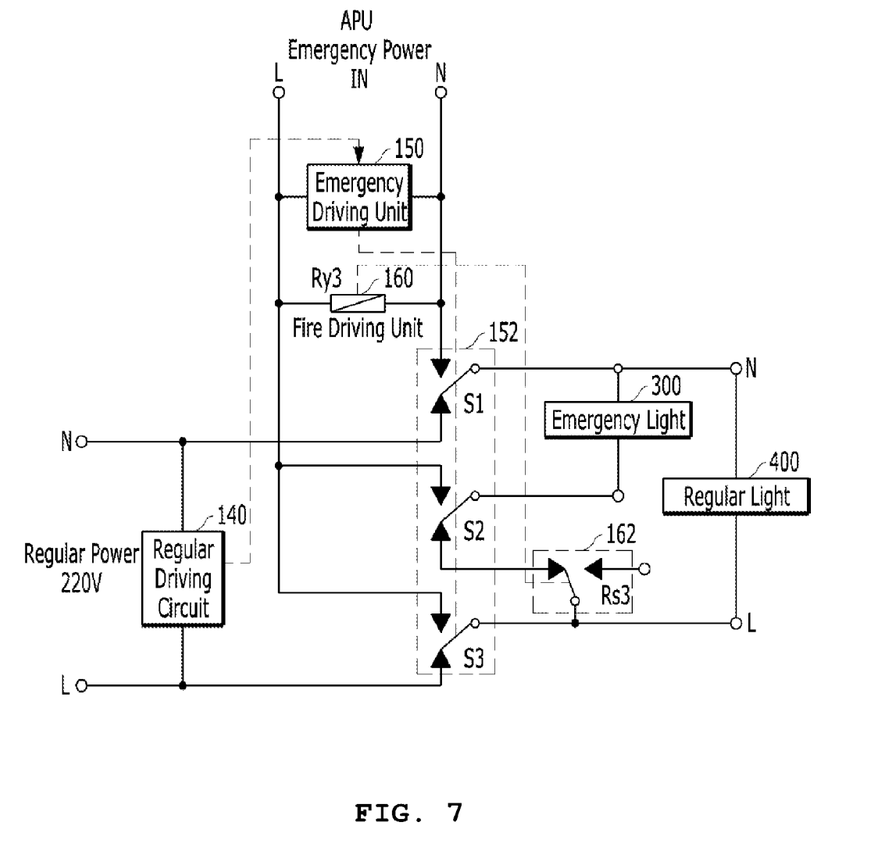
FIG. 7 is a system diagram illustrating a state in which an emergency light is automatically turned on when a fire occurs in a live wire state of the regular power according to the embodiment of the present invention.

FIG. 6 is a system diagram illustrating a state in which the emergency power is supplied when a fire occurs in a live wire state of the regular power according to the embodiment of the present invention. FIG. 7 is a system diagram illustrating a state in which the emergency light is automatically turned on when a fire occurs in a live wire state of the regular power according to the embodiment of the present invention. Referring to FIGS. 6 and 7, the process in which the emergency light is automatically turned on in a state where the regular power is alive will be described.

Referring to FIG. 6, the regular power monitoring relay 110 is energized because the regular power is alive, and the contact switch 112 of the regular power monitoring relay is opened. However, due to a fire, power is supplied to the firefighting power monitoring relay 120, and the contact switch 122 of the firefighting power monitoring relay supplies power from the ATS to the magnetic switch 130. Since the regular power is alive, the power from the ATS is the regular power.

Then, the contact switches Ms1 and Ms2 of the magnetic switch 130 are closed to apply the regular power from the ATS to the emergency power input unit (APU emergency power IN) of FIG. 7.

Since the emergency driving unit 150 is inter-locked by the regular driving circuit 140, the emergency driving unit 150 is not operated. Thus, the changeover switch 152 is switched over to the regular power as illustrated in FIG. 7.

At this time, while power is supplied to the fire driving unit (Ry3) 160 installed in the emergency power input unit, the emergency light auto lighting switch (Rs3) 162 is switched over from the state of FIG. 4 to the state of FIG. 7. Thus, the neutral wire of the regular power is supplied to one terminal of the emergency light 300 through the first switch S1, and the phase wire of the regular power is supplied to the other terminal of the emergency light 300 through the third switch S3, the emergency light auto lighting switch 162, and the second switch S2. Thus, the emergency light 300 is automatically turned on as in a state where the emergency power is supplied.

That is, the power (regular power) from the ATS is supplied to the emergency power input unit (APU emergency power IN) in the live wire state of the regular power, the fire driving unit 160 is operated in a state where the operation of the emergency driving unit 150 is inter-locked, and the regular power is connected to the other terminal of the emergency light 300 through the third switch S3, the emergency light auto lighting switch 162, and the second switch S2 without switching the changeover switch 152. Then, the emergency light 300 is automatically turned on.

Thus, when a fire occurs, the emergency light may be automatically turned on by the regular power without a separate switch operation, such that people in danger can safely escape from the building through emergency paths and emergency exits.

While various embodiments have been described above, it will be understood to those skilled in the art that the embodiments described are by way of example only. Accordingly, the disclosure described herein should not be limited based on the described embodiments.

What is claimed is:

1. An auxiliary power unit (APU) for an emergency light in case of a fire or power failure, comprising:
    a regular power input unit installed at the rear of a switching unit for switching over between regular power and emergency power, and configured to receive the regular power and supply the received regular power to a regular light;
    an emergency power input unit configured to receive the emergency power and supply the received emergency power to an emergency light;
    a changeover switch configured to switch the power input such that the emergency light is automatically turned on by the emergency power in case of a power failure of the regular power;
    a firefighting power monitoring relay operated by firefighting power when a fire occurs;
    a firefighting-power-monitoring-relay contact switch configured to connect power from an ATS (Auto Changeover switch) to the emergency power input unit in connection with the firefighting power monitoring relay;
    a fire driving unit installed in the emergency power input unit and operated by the power inputted to the emergency power input unit; and
    an emergency light auto lighting switch configured to connect the emergency light to the regular power input unit in connection with the fire driving unit, such that the emergency light is automatically turned on.

2. The APU of claim 1, wherein the regular power input unit has a regular driving circuit installed therein, the emergency power input unit has an emergency driving unit installed therein, and the regular driving circuit blocks the operation of the emergency driving unit when the regular power is supplied.

3. The APU of claim 2, wherein the regular driving circuit comprises a microcomputer which detects the regular power supplied to the regular power input unit and outputs a switching signal for switching the connection between the emergency power input unit and the emergency driving unit.

4. The APU of claim 3, wherein the regular driving circuit further comprises a regular power display LED and a photo coupler which are connected in series between a phase wire and a neutral wire of the regular power input unit, and an emergency power display LED connected between a clock output terminal of the microcomputer and the ground,
    the photo coupler has an emitter terminal connected to a DC constant voltage terminal through a resistor and a collector terminal connected to the ground, and
    the microcomputer has an input terminal connected to a connection point between the emitter terminal and the resistor, and receives an input signal to flicker the emergency power display LED in a state where the photo coupler is turned off.

* * * * *